Patented Aug. 31, 1948

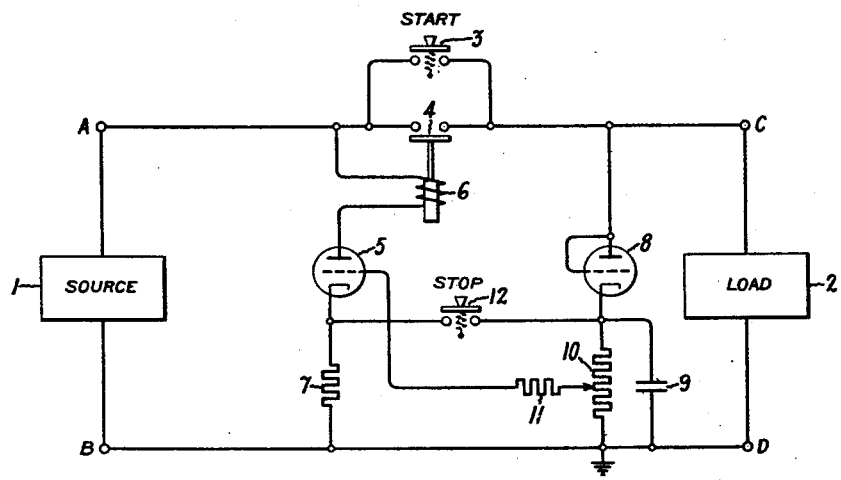

2,448,371

UNITED STATES PATENT OFFICE

2,448,371

CIRCUIT MAKING AND BREAKING IN RESPONSE TO POWER FAILURE

Michael E. Hiehle, Syracuse, N. Y., assignor to General Electric Company, a corporation of New York Application April 4, 1946, Serial No. 659,642

5 Claims. (Cl. 175—294)

My invention relates to electrical controls and more particularly to connecting and disconnecting utilization devices from an energy source in accordance with predetermined values of time delay.

It is an object of this invention to provide means for manually connecting and disconnecting a utilization device from a source of energy, automatically disconnecting said device if power at said source fails, and automatically reconnecting said device if power is restored within a predetermined time.

It is a further object of this invention to provide improved means to connect and disconnect a utilization device from a source of energy which means may be used either with direct current or alternating current.

The novel features believed to be characteristic of this invention are set forth with particularity in the appended claims. My invention itself, however, both as to its organization and method of operation together with further objects and advantages thereof may best be understood by reference to the following description taken in connection with the accompanying drawing.

In the drawing a schematic diagram of one embodiment of this invention is shown. A source of electrical energy 1 is connected to input terminals A and B while utilization device 2 is connected to terminals C and D. Manual switch 3 and automatic switch 4 provide alternate means of energizing utilization device 2 from source 1. Electron discharge device 5 is connected in series relationship with operating coil 6 of automatic switch 4 and resistance 7 across terminals A and B. Automatic switch 4 is maintained in the open position when unenergized by the downward pull of gravity on the contact mechanism.

Electron discharge device 8 is connected in series with capacitor 9 across terminals C and D which terminals are connected to utilization device 2. Potentiometer 10 is connected across condenser 9 and the moving contact thereof connected to the control electrode of device 5 through resistance 11. Stop switch 12 is connected between the cathode of device 5 and the cathode of device 8.

In the operation of the embodiment of this invention shown in the drawing, utilization device 2 is connected to the source of energy by start switch 3. The latter may either be manually operated or be the contacts of an appropriate relay. This applies voltage across device 8 and condenser 9, thereby causing condenser 9 to be charged at a rate determined by the equivalent space path resistance of device 8. As condenser 9 charges, voltage appears across its terminals and consequently a voltage exists between the moving terminal of potentiometer 10 and ground. This voltage is positive with respect to ground because current flowing through device 8 is in direction to cause the cathode of that device to become positive with respect to ground. This voltage is applied to the control electrode of device 5 through resistance 11, thereby tending to increase space current flow through that device.

Device 5, resistance 7, and relay coil 6 are chosen of values such that, with the control electrode of that device at ground potential, current flow therethrough is not of sufficient magnitude to cause coil 6 to close switch 4. However, as condenser 9 charges the increased positive potential at the control electrode of device 5 causes greater space current flow through device 5. Coil 6 is energized to the degree necessary to close switch 4 when the charge on condenser 9 reaches a predetermined value, thus causing voltage to continue to be applied to utilization device 2 even though start switch 3 is subsequently opened.

The time interval between closing start switch 3 and energizing automatic switch 4 may be made very short by appropriate choice of capacity of condenser 9 and space path resistance of device 8. It is usually desirable to make this time interval as short as possible in order to prevent misoperation if start switch 3 is released very suddenly after being closed. In one construction of this invention, for example, the space path resistance of device 8 is of the order of 50,000 ohms and condenser 9 is 1 microfarad, thereby providing a charging time constant of 0.05 second. In this case it is readily possible to close automatic switch 4 in 0.03 second.

Utilization device 2 may be disconnected from source of energy 1 by closing stop switch 12. This causes the cathode of device 5 to assume the same potential as the cathode of device 8 and a relatively positive potential with respect to the control electrode of device 5. The resultant reduction in space current flow through device 5 causes the automatic switch to drop out, thereby opening contact 4 and disconnecting utilization device 2. At the same time capacitor 9 is discharged through resistor 7, preventing reoperation of coil 6 when switch 12 is opened.

A feature of this invention resides in the method of automatically reenergizing utilization device 2 if power is restored at source 1 within a predetermined time after loss of power. This performance is achieved by discharging condenser 9 at a relatively slow rate when current flow ceases through device 8. When voltage ceases to exist at source 1, the anode of device 8 becomes negative with respect to the positive voltage at the cathode due to the charge on condenser 9 and current flow therethrough ceases. Similarly, current flow through device 5 stops and automatic switch 4 opens. Condenser 9 slowly discharges through resistance 10 at a rate determined by the value of that resistance. If power is restored from the source before the potential of the moving terminal of potentiometer 10 reaches a predetermined value, the bias on the control electrode of device 5 will be above the limiting value and current flow through device 5 causes automatic switch 4 to automatically reconnect utilization device 2. In the above-described embodiment of this invention, potentiometer 10 was made 2 megohms, thereby providing a 2 second time constant of discharge for condenser 9. With potentiometer 10 set to cause closure of automatic switch 4 in 0.03 second after operating switch 3, this system gave a 2 second time delay during which automatic switch 4 would be reclosed on re-application of power. In the event that a sufficient time elapses after loss of power from the source, the voltage at condenser 9 is not sufficient to cause automatic switch 4 to operate and switch 3 must be operated to energize the utilization device.

The operation of this invention may be summarized as follows:

1. If voltage exists at source 1, utilization device 2 is immediately energized upon closing start switch 3 and remains in the energized condition after release of that switch, provided only that switch 3 is closed for the small time period required to place a predetermined charge on condenser 9.

2. Utilization device 2 is disconnected from source 1 upon closing stop switch 12 and remains disconnected.

3. If source 1 becomes deenergized, utilization device is immediately disconnected therefrom.

4. If energy is again supplied from source 1 within a predetermined time interval, utilization device 2 is automatically reconnected. If a greater time interval elapses, no reconnection takes place.

A typical application of this invention is in the anode potential supply circuits to the tubes of a radio transmitter. In this case, it is highly desirable that lost operating time or power failure be minimized. At the same time, however, it is essential that anode voltage not be applied when the tube filaments are not heated as damage to the tubes is then likely to result. In this case, the time constant of potentiometer 10, and condenser 9, together with the setting of potentiometer 10, is made to correspond with the natural cooling characteristic of the transmitting tubes so that automatic switch 4 will automatically pick up on reapplication of voltage from source 1 when the tube filaments are hot but not otherwise. In this case, therefore, the time lost upon power interruption is reduced to a minimum value without endangering the tubes. Switch 3 is provided with a separate timing device to give proper time delay between application of filament power and plate power, thereby providing a complete protective system for the radio transmitter.

While I have shown and described a particular embodiment of my invention, it will, of course, be understood that I do not wish to be limited thereto since various modifications both in the circuit arrangements and the instrumentalities employed may be made and I contemplate in the appended claims to cover all such modifications as fall within the true spirit and scope of my invention.

What I claim as new and desire to secure by Letters Patent of the United States is:

1. In combination, a source of electromotive force, a utilization device, push button means to connect said source to said device, said means having a circuit closed position and a circuit open position and normally assuming said open position, an energy storage device, means to charge said storage device in accordance with the electromotive force at said utilization device, auxiliary relay means in shunt to said push button means to connect said source to said device, said relay means having a circuit closed position and a circuit open position and assuming said open position when unenergized and assuming said closed position when energized, means to energize said relay means when said storage means reaches a predetermined value of energy and a predetermined voltage exists at said source, thereby to maintain voltage at said utilization device independent of said first means, and means to discharge said storage means at a relatively slow rate upon failure of voltage from said source, thereby to reclose said relay means if voltage from said source is restored within a predetermined time interval after interruption.

2. In combination, a source of electromotive force; an electron discharge device connected across said source, said device having a cathode, a control electrode, and an anode; a utilization device; push button means for connecting said utilization device to said source, an energy storage device; means to charge said last device in accordance with the electromotive force at said utilization device; means to bias said control electrode with respect to said cathode in accordance with the charge on said storage device, thereby to decrease the negative bias of said control electrode relative to said cathode as said storage device is charged; means to energize said utilization device from said source, said last means having an open position and a closed position, means to close said last means when the current flow in said first device exceeds a predetermined value and to open said last means when the current flow in said first device is less than a predetermined value; means to discharge said storage device at a relatively slow rate, thereby maintaining a charge sufficient to cause reenergization of said utilization device if voltage at said source is restored within a predetermined time after interruption, and means rapidly to discharge said storage device, thereby to deenergize said utilization device at will.

3. In combination, a source of electromotive force, a utilization device, means to connect said source to said device, said means having a circuit closed position and a circuit open position and normally assuming said open position, an energy storage device, means to charge said storage device in accordance with the electromotive force at said utilization device, auxiliary means to connect said source to said device, said auxiliary means having a circuit closed position and a circuit open position and assuming said open position when unenergized and said closed position when energized, means to energize said auxiliary means when said storage means reaches a predetermined value of energy and a predetermined voltage exists at said source, thereby to maintain voltage at said utilization device independent of said first means, and means to discharge said storage means at a relatively slow rate upon failure of voltage from said source, thereby maintaining said predetermined value of energy to reclose said auxiliary means if voltage from said source is restored within a predetermined time interval after interruption, and means to rapidly discharge said storage device, thereby to deenergize said utilization device at will.

4. In combination, a source of electromotive force, a load, push button means to connect said source to said load, said means having a pair of normally open contacts, an energy storage device, means to charge said storage device rapidly in accordance with the electromotive force at said load, auxiliary relay means having a pair of normally open contacts in a shunt with said push button contacts, means including an electron discharge device connected across said source for energizing said relay means, said discharge device being rendered conductive by charge in said storage device, means to discharge said storage device at a relative slow rate, thereby to render said discharge device conductive if said voltage at source is restored within a predetermined time after interruption.

5. The combination, with electromagnetic switch means for connecting an electrical utilization device to a source of electromotive force which is subject to fluctuations which may cause the electromagnetic switch means to disconnect said device from said source, of push button means having normally open contacts in shunt with the electromagnetic switch for initially energizing the utilization device, an energy storage device, means to charge said storage device rapidly in accordance with the electromotive force at said load, means including an electron discharge device connected across said source for energizing said electromagnetic switch means, said discharge device being rendered conductive by charge on said storage device and thereby closing said electromagnetic switch, means to discharge said storage device at a relative slow rate upon interruption of electromotive force from said source, whereby if said electromotive force returns to normal within a predetermined time said storage device will have sufficient charge to render said electron discharge device again conductive and to reenergize said electromagnetic switch means.

MICHAEL E. HIEHLE.

REFERENCES CITED

The following references are of record in the file of this patent:

UNITED STATES PATENTS

| Number | Name | Date |
| --- | --- | --- |
| 1,729,871 | Graybill | Oct. 1, 1929 |
| 2,050,076 | Wilms | Aug. 4, 1936 |
| 2,061,011 | Vingerhoets | Nov. 17, 1936 |
| 2,287,617 | Jones | June 23, 1942 |